United States Patent [19]

Leal

[11] 4,450,644
[45] May 29, 1984

[54] FISHING LURE

[76] Inventor: Vitervo Leal, 4744 N. Whipple, Chicago, Ill. 60625

[21] Appl. No.: 426,150

[22] Filed: Sep. 28, 1982

[51] Int. Cl.³ .............................................. A01K 85/00
[52] U.S. Cl. .................................. 43/42.2; 43/42.25; 43/42.46
[58] Field of Search ................. 43/42.19, 42.46, 42.2, 43/42.21, 42.16, 42.17, 42.25

[56] References Cited

U.S. PATENT DOCUMENTS

| D. 162,741 | 4/1951 | Lawhon | 43/42.19 X |
| 2,494,407 | 1/1950 | Rhodes | 43/42.36 |
| 3,221,436 | 12/1965 | Mikus | 43/42.17 |

FOREIGN PATENT DOCUMENTS

| 1083780 | 8/1957 | France | 43/42.19 |
| 1294840 | 4/1962 | France | 43/42.2 |

Primary Examiner—Nicholas P. Godici
Assistant Examiner—P. Weston Musselman, Jr.

[57] ABSTRACT

Fishing lure includes a one-piece body of generally torpedo shaped configuration with opposed end portions that each include a rod-like portion and a tapering portion. A propeller and sleeve of colored material are mounted along one of the rod-like portions.

9 Claims, 2 Drawing Figures

U.S. Patent    May 29, 1984    4,450,644
FIG. 1
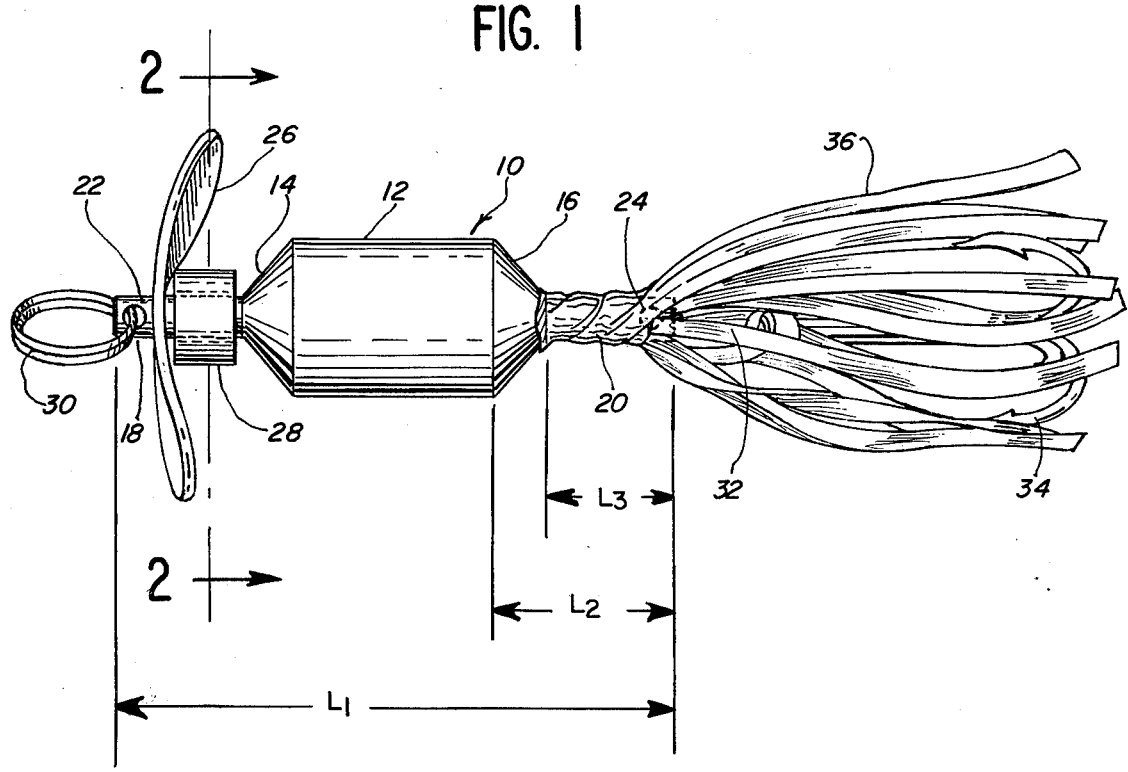
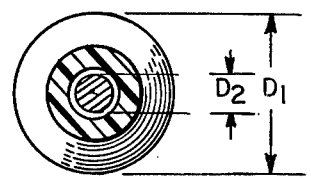
FIG. 2

FISHING LURE

The present invention relates to fishing lures and, more specifically, to an improved lure suitable for casting and trolling.

It is desirable when fishing, for example, from a lake shoreline for coho and other game fish to be able to cast a lure extremely long distances. Such generally requires relatively heavy lures and rods capable of handling such lures. However, such lures are not necessarily effective for certain species of fish and, furthermore, many sportsmen either lack or do not enjoy use of the type of rods required for casting heavy lures.

SUMMARY OF THE INVENTION

An object of the present invention is to provide a relatively small, lightweight lure capable of being cast long distances, the lure being of durable but inexpensive construction.

It is a further object to provide a lure capable of use as a trolling lure.

A still further object is to provide a lure construction enabling ease of adaptation by the user.

A fishing lure in accordance with the present invention comprises a one-piece body of generally torpedo shaped configuration having an elongated central body portion that includes first and second opposed end portions. Each end portion includes an elongated rod-like portion having a free end and a tapering portion integrally connecting the rod-like portion and the central body portion. Openings are provided near the free ends of the rod-like portions to receive split rings or other suitable means for affixing a hook at one end and the line to the other end. One of the rod-like portions has a spinning means, preferrably a propeller, and a colored collar or sleeve mounted therealong. A skirt is preferrably affixed to the other of the rod-like portions.

The one-piece body is preferably of solid material with the surface being highly light reflective.

The generally torpedo shaped one-piece body in combination with the propeller type spinning means relatively low air drag. Relatively small size of the lure, coupled with the low air drag characteristics affords long casting opportunity.

The symmetric configuration of the one-piece body also enables several to be gauged in series, one or more of which may have one or more spinners. Thus, a variety of lure configurations are possible.

Other features and advantages of the invention will be apparent from the following description and claims, and are illustrated in the accompanying drawings which show structure embodying preferred features of the present invention and the principles thereof, and what is now considered to be the best mode in which to apply these principles.

BRIEF DESCRIPTION OF THE DRAWINGS

FIG. 1 is a side view showing a lure embodying the present invention; and

FIG. 2 is a sectional view taken, as indicated, along the line 2—2 of FIG. 1.

DETAILED DESCRIPTION

With reference now to the drawings the lure 10 is shown to comprise a one-piece body that includes an elongated, generally cylindrically shaped, central body portion 12 having opposed end portions. In the presently preferred embodiment illustrated herein the end portions are identical in configuration and comprise tapering portions 14, 16, together with elongated rod-like portions 18, 20. The rod-like portions 18, 20 each have a transverse opening 22, 24 located near the free end thereof.

Spinning means in the form of a propeller 26 is mounted along rod-like portion 18 to spin thereabout as the lure travels through water. A sleeve 28 of colored material is also mounted on portion 18 between the propeller 26 and tapered portion 14. As the blades of the propeller spin, the color of the sleeve 28 creates a flashing of color. A split ring 30 passes through opening 22 and serves as a means of securing the propeller 26 and sleeve 28 in place as well as to secure the lure to a line. Another split ring 32 passing through opening 24 serves to connect a treble hook 34 to the lure. Finally, a skirt 36 of rubber or plastic material is suitably affixed to rod-like portion 20.

In the presently preferred form illustrated herein the lure dimensions are as follows:

Length $L_1$ of the one-piece body is 1½ inch; the length $L_2$ of each of the end portions is ¾ inch; the length $L_3$ of each of the rod-like portions 18, 20 is 5/16 inch; the diameter D, of the central body portion 12 is 7/16 inch; and the diameter $D_2$ of the rod-like portions is 9/64 inch.

The one-piece body is preferrably formed of chrome plated steel or other material having a highly light reflective surface. In its presently preferred form the lure weighs slightly over 1 ounce.

A variety of lure configurations is possible by connecting one-piece body portions in series. For example, rather than tying a line to split ring 30, the split ring can be connected to another one-piece body so as to form a jointed lure.

Thus, while preferred constructional features of the invention are embodied in structure illustrated herein, it is to be understood that changes and variation may be made by those skilled in the art without departing from the spirit and scope of the appended claims.

What is claimed is:

1. A fishing lure comprising a solid one-piece body having a continuous elongated central body portion of axially uniform transverse dimension and, first and second opposed end portions, each of said end portions including an elongated rod-like portion of a transverse dimension substantially less than that of said axially uniform transverse dimension and having a free end, and a tapering portion integrally connecting said rod-like portion and said central body portion, means mounted along the rod-like portion of the first of said end portions to freely spin relative thereto in response to travel of said lure through water, a hook, and means for securing said hook near the free end of the rod-like portion of the second of said end portions.

2. A fishing line in accordance with claim 1, and further including a sleeve of colored material mounted along the rod-like portion of the first of said end portions between the spinning means and the tapering portion.

3. A fishing line in accordance with claim 2 and further including a skirt secured to the rod-like portion of the second of said end portions.

4. A fishing lure in accordance with claim 3 wherein said central body portion is cylindrically shaped.

5. A fishing lure in accordance with claim 4 wherein the rod-like portion of each of said end portions includes a transverse opening near the free end thereof.

6. A fishing lure in accordance with claim 5 and further including a ring extending through each said opening.

7. A fishing lure in accordance with claim 6 wherein the spinning means comprises a propeller.

8. A fishing lure in accordance with claim 7 wherein the surface of said one-piece body is light reflective.

9. A fishing lure in accordance with claim 8 wherein said first average transverse dimension is approximately 7/16 inch, said second average transverse dimension is approximately 9/64 inch. The axial length of said one-piece body is approximately 1½ inch, the axial length of each rod-like portion is approximately 5/16 inch, and each said tapering portion defining an angle of approximately 45°.

* * * * *